Oct. 10, 1961 G. DUHAMEL 3,003,726
PIPE HANGER AND SADDLE
Filed June 8, 1960
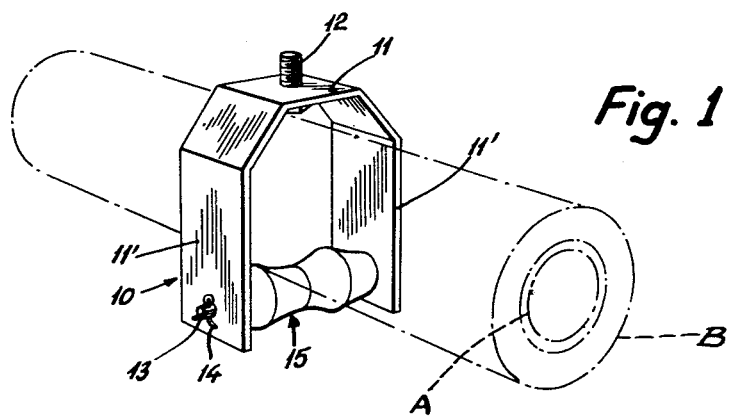
Fig. 1
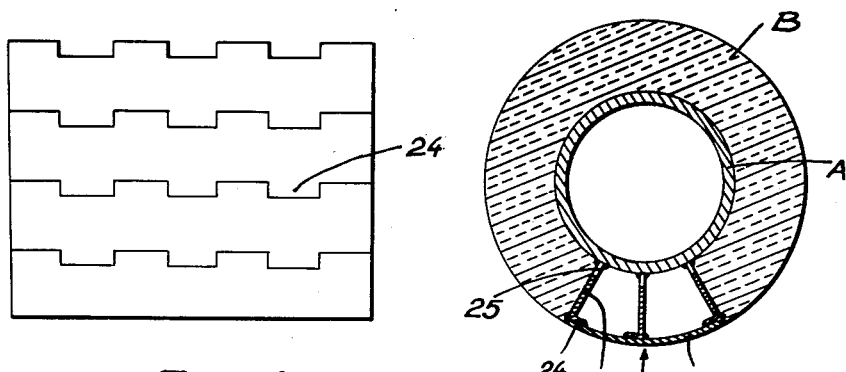
Fig. 4
Fig. 3
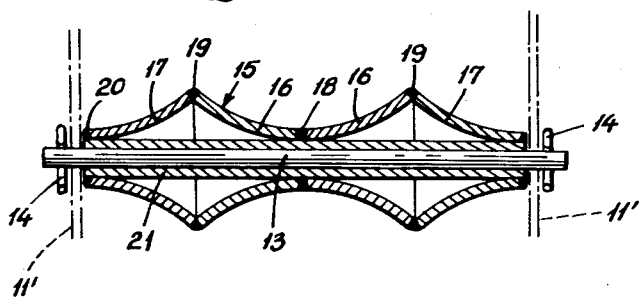
Fig. 2
INVENTOR
Gérard DUHAMEL
BY
PATENT AGENT

3,003,726
PIPE HANGER AND SADDLE
Gérard Duhamel, 20 Danis Ave., Cornwall,
Ontario, Canada
Filed June 8, 1960, Ser. No. 34,680
1 Claim. (Cl. 248—55)

The present invention relates to improved means for suspending large diameter steam or water pipes from a ceiling or other supporting structure.

Pipes having a diameter in the range of eight inches and over and which are subjected to changes in the temperature of their content, have to be supported by hangers designed such as to permit easy relative movement between the hanger and the pipes due to expansion and contraction of the latter.

Pipes carrying substances above or below room temperature have to be insulated and when large diameter pipes are insulated in this way, they have to be supported in the hanger by a saddle of a rigid construction and merging with the outside surface of the insulation.

It is known to provide pipe hangers with a supporting roller which allows for easy displacement of the pipe relative to the hanger. However, conventional rollers are made of solid metal such as cast iron and are very heavy to hold at arm's length during the installation of the hangers and pipe. Moreover, such cast iron rollers are usually maintained in position by bolts and nuts which are rather difficult to assemble when working above head or in close quarters.

Saddles of usual construction consist in a curved plate supported by flat webs welded thereto and to the pipe. This arrangement forms a saddle of weak construction which often collapses or buckles under impact.

It is therefore the main object of the present invention to provide a hanger and saddle construction which obviates the above mentioned disadvantages.

Another important object of the present invention is the provision of a pipe hanger roller of sheet metal construction and which is yet very strong and durable and of light weight.

Yet another important object of the present invention is the provision of improved means for supporting the roller on the hanger.

Still another important object of the present invention is the provision of a pipe saddle of improved and stronger construction and which does not use any more sheet metal than conventional saddles.

The foregoing and other important objects of the present invention will become more apparent during the following disclosure and by referring to the drawings in which:

FIGURE 1 is a perspective view of the pipe hanger of the present invention showing, in dot and dash line, a pipe supported thereby;

FIGURE 2 is an enlarged longitudinal section of the hanger roller and of the means for supporting the same in the hanger;

FIGURE 3 is a cross section of the pipe having a saddle in accordance with the present invention; and FIGURE 4 is a top plan view of part of a blank used to make the webs of the saddle.

Referring now more particularly to the drawings in which like reference characters indicate like elements throughout, the hanger of the present invention comprises an inverted U-shaped member made of sheet metal and having in the bight 11 thereof an aperture for receiving a bolt 12 serving to suspend the hanger from a ceiling or other supporting structure. The hanger comprises depending side arms 11' each having at its lower end an aperture for receiving a transversely extending rod 13 which is removable and is adapted to be maintained in position by means of cotter pins 14 passing through transverse holes made in the projecting ends of the rod 13.

A roller generally indicated at 15 is mounted for rotatable movement on the rod 13 and is adapted to support a pipe A provided with insulation B on top of said roller and through the U-shaped hanger, as shown in FIGURE 1.

In accordance with the present invention the roller 15 is constituted by frusto-conical sections 16 and 17 welded together in and to end abutting relationship. The two central sections 16 are welded at 18 by their smaller end and each central section 16 has its larger base welded at 19 to the larger base of the outer frusto conical section 17. The small end of the latter is in turn welded to the end of a sleeve 21 extending through the sections 16 and 17 and freely engaging the rod 13. The central weld 18 serves also to fix the sleeve 21 to the two central frusto-conical sections 16. The sections 16 and 17 are preferably of identical shape so as to form two symmetrical half roller parts on each side of the center line of the roller which is defined by the line passing through weld 18. Each section is longitudinally concave so as to form a central circular concave portion between the two welds 19 fitting the pipe and more particularly the saddle S secured to the pipe A. Thus, the pipe is located by the form of the roller and said roller allows longitudinal contraction and expansion movements of the pipe relative to the hanger. The particular construction of the roller provides free spaces between the sleeve 21 and the frusto-conical sections 16 and 17 thereby effecting considerable reduction in weight especially in rollers for large diameter pipes of eight to ten inches and over. The roller of the present invention is very strong in construction and will resist considerable impact..

The manner of retaining the roller and rod 13 by means of cotter pin 14 enables to effect easy removal of the assembly even after prolonged service and even if the pins are rusted or otherwise corroded by the surrounding atmosphere.

The pipe A provided with a thick insulation B made of asbestos or the like relatively weak material, is supported on the roller 15 by means of a saddle S. In accordance with the present invention said saddle is constituted by a rectangular metal sheet 22 of curve cross section to conform to the periphery of the insulation B and flush with the same so that the insulation may present an uninterrupted surface. The plate 22 is supported in spaced coaxial relationship with respect to the pipe A by means of radially extending webs 23 which are cut out from a blank, as shown in FIGURE 4, so as to provide longitudinally extending crenelated edges which are formed by alternating rectangular projections and recesses 24 and 25 respectively. The projections 24 along the outer edge of the webs are bent back at substantially right angle to be welded to the inside of the curved plate 22 whereas the projections 24 at the inner edge of the webs 23 are welded on edge to the pipe A. If desired, and for further reinforcing the saddle against lateral deformation or buckling, the projections 24 at the inner edge of the webs 23 can also be bent back at right angles and also if desired alternately, on both sides of the web.

It has been found that with the arrangement illustrated a very strong saddle can be obtained without increasing in any way the amount of sheet metal needed.

While a preferred embodiment in accordance with the present invention has been illustrated and described, it is understood that various modifications may be resorted to without departing from the spirit and scope of the appended claim.

What I claim is:

In a pipe insulated with a thick insulating outside layer, a metal saddle for supporting said pipe on the roller of a pipe hanger, said saddle having an outside surface flush with the outside surface of said insulating layer, said saddle being constituted by a curved outer plate and webs radially extending from said pipe to said plate for supporting the latter, said webs each consisting of elongated sheet metal strips having longitudinal crenelated inner and outer edges forming alternating recesses and projections, the projections of at least the outer edge of said webs being bent back and applied against the inside face of said curved plate and secured thereto while the inner crenelated edge of said webs is secured to said pipe to thereby provide strong and rigid fixation of said curved plate to said pipe.

References Cited in the file of this patent

UNITED STATES PATENTS

| | | |
|---|---|---|
| 1,240,521 | Wendland | Sept. 18, 1911 |
| 1,291,079 | Morris | Jan. 14, 1919 |
| 1,476,473 | Skinner | Dec. 4, 1923 |
| 1,788,939 | Axlund | Jan. 13, 1931 |
| 2,103,811 | Davis | Dec. 4, 1937 |